US012596905B2

(12) United States Patent
Buhler et al.

(10) Patent No.: US 12,596,905 B2
(45) Date of Patent: Apr. 7, 2026

(54) SYSTEMS, DEVICES AND METHODS OF TRACKING INVENTORY

(71) Applicants: James Buhler, Cranbrook (CA); Luke Elias, Cumberland (CA)

(72) Inventors: James Buhler, Cranbrook (CA); Luke Elias, Cumberland (CA)

(73) Assignee: Muskoka Cabinet Company Inc., Alfred (CA)

( * ) Notice: Subject to any disclaimer, the term of this patent is extended or adjusted under 35 U.S.C. 154(b) by 0 days.

(21) Appl. No.: 18/714,901

(22) PCT Filed: Aug. 22, 2023

(86) PCT No.: PCT/CA2023/051109
§ 371 (c)(1),
(2) Date: May 30, 2024

(87) PCT Pub. No.: WO2024/040340
PCT Pub. Date: Feb. 29, 2024

(65) Prior Publication Data
US 2025/0028927 A1 Jan. 23, 2025

Related U.S. Application Data

(60) Provisional application No. 63/399,877, filed on Aug. 22, 2022.

(51) Int. Cl.
*G06K 7/08* (2006.01)
*G06K 7/10* (2006.01)
*G06K 19/077* (2006.01)

(52) U.S. Cl.
CPC ... *G06K 19/07758* (2013.01); *G06K 7/10297* (2013.01); *G06K 2007/10504* (2013.01)

(58) Field of Classification Search
CPC ....... G06K 19/07749; G06K 19/07758; G06K 19/0717; G06K 19/0776; G06K 19/0712; G06K 7/10128; G06K 7/10297
(Continued)

(56) References Cited

U.S. PATENT DOCUMENTS 4,299,870 A * 11/1981 Humble .............. E05B 73/0017
428/101
4,813,564 A * 3/1989 Cooper ................ B65D 5/4291
336/200
(Continued)

FOREIGN PATENT DOCUMENTS

JP 2007233533 9/2007

OTHER PUBLICATIONS

Canadian Intellectual Property Office, International Search Report and Written Opinion of the International Searching Authority dated Nov. 8, 2023.

*Primary Examiner* — Daniel St Cyr
(74) *Attorney, Agent, or Firm* — Smart & Biggar LP

(57) ABSTRACT

Systems, devices and methods of tracking a piece of inventory are described herein. Each of the systems, devices and methods includes a dowel to be placed inside of a dowel sleeve of the piece of inventory. The dowel includes a first surface configured to be spaced apart from an inner surface of the dowel sleeve and to support a radio frequency identification (RFID) tag thereon. The dowel also includes a plurality of contact portions positioned around a periphery of the dowel, two of the contact portions being positioned on opposed sides of the first surface, each of the two contact portions having an edge extending along a longitudinal axis of the dowel to define a side of the first surface, each of the (Continued)

edges being configured to contact an inner surface of the dowel sleeve to frictionally retain the dowel in the dowel sleeve.

17 Claims, 5 Drawing Sheets

(58) Field of Classification Search
 USPC .............................. 235/451, 462.46, 472.02
 See application file for complete search history.

(56) References Cited

U.S. PATENT DOCUMENTS

| | | | |
|---|---|---|---|
| 5,880,675 | A | 3/1999 | Trautner |
| 10,366,318 | B2 * | 7/2019 | Blank .............. G06K 19/07722 |
| 2007/0159336 | A1 * | 7/2007 | Tethrake ................ G06K 19/04 |
| | | | 340/572.7 |
| 2009/0045963 | A1 * | 2/2009 | Vigneron ......... G06K 19/07798 |
| | | | 340/572.8 |
| 2017/0177990 | A1 * | 6/2017 | Hansen ................ H01Q 1/2216 |
| 2021/0209436 | A1 * | 7/2021 | Trivelpiece ...... G06K 19/07754 |

* cited by examiner

SYSTEMS, DEVICES AND METHODS OF TRACKING INVENTORY

CROSS-REFERENCE TO RELATED APPLICATIONS

This application claims the benefit of U.S. Provisional Patent Application No. 63/399,877 filed Aug. 22, 2022. The entire contents of U.S. Provisional Patent Application No. 63/399,877 is hereby incorporated by reference herein for all purposes.

TECHNICAL FIELD

This disclosure relates generally to tracking systems, and more specifically, to systems, devices and methods of tracking inventory.

BACKGROUND

Radio Frequency Identification (RFID) tags are a type of tracking system that use smart barcodes to identify items. For instance, RFID tags are commonly used to track pieces of inventory in a warehouse, such as but not limited to manufactured parts and/or work pieces. RFID tags contain electronically stored information that can be retrieved using a scanner or a reader without contacting the tag.

RFID tags are commonly used in manufacturing settings where they can be attached to a work piece to provide for the work piece to be electronically tracked through production to completion of a finished article. When attached to the work piece, the RFID tag can include data for inventory control and instructions for incorporating the work piece into a product during manufacturing.

In many settings, it may be undesirable for RFID tags to be visible or placed on pieces of inventory where they may be easily damaged or detached from the work piece.

Accordingly, there is a need for improved systems, devices and methods for securely positioning RFID tags on pieces of inventory where they are not easily damaged, accessible to RFID scanners or readers and not prone be being detached from the workpiece.

SUMMARY

In accordance with a broad aspect, a dowel for placement inside of a dowel sleeve of a piece of inventory for tracking a position of the piece of inventory is described herein. The dowel includes a first surface configured to be spaced apart from an inner surface of the dowel sleeve and to support a radio frequency identification (RFID) tag thereon. The dowel also includes at least one contact portion, and optionally a plurality of contact portions, positioned around a periphery of the dowel. The contact portion(s) is/are positioned on opposed sides of the first surface two edges extending along a longitudinal axis of the dowel, each defining a side of the first surface. Each of the edges is configured to contact an inner surface of the dowel sleeve to frictionally retain the dowel in the dowel sleeve.

In at least one embodiment, at least one edges extends along an entire length of the dowel of the dowel.

In at least one embodiment, each of the two edges extend along an entire length of the dowel of the dowel.

In at least one embodiment, each of the contact portions includes an upper edge extending along the longitudinal axis of the dowel, the upper edges defining the sides of the first surface; and a lower edge vertically spaced apart from the upper edge by a height of the dowel and extending along the longitudinal axis of the dowel, the lower edges being configured to contact the inner surface of the dowel sleeve to frictionally retain the dowel in the dowel sleeve.

In at least one embodiment, the upper edges and the lower edges each extend along an entire length of the dowel.

In at least one embodiment, the upper edges are laterally spaced apart from each other by a distance that is less than a maximum width of the dowel sleeve.

In at least one embodiment, the upper edges are laterally spaced apart from each other by a distance configured to provide a cavity between the inner surface of the dowel sleeve and the first surface of the dowel.

In at least one embodiment, the first surface is a planar surface.

In at least one embodiment, the upper edges are laterally spaced apart from each other by a distance that is greater than a height of the dowel.

In at least one embodiment, each of the contact portions includes a middle edge being vertically spaced apart from and between the upper edge and the lower edge.

In at least one embodiment, each of the contact portions includes three edges and the dowel includes two contact portions.

In at least one embodiment, the dowel has a height of about 5 mm.

In at least one embodiment, the dowel has a width of about 8 mm.

In at least one embodiment, the dowel has a length of about 38 mm.

In accordance with another broad aspect, a dowel system for tracking a position of a piece of inventory is described herein. The system includes a dowel for placement inside of a dowel sleeve of a piece of inventory for tracking a position of the piece of inventory is described herein. The dowel includes a first surface configured to be spaced apart from an inner surface of the dowel sleeve and to support a radio frequency identification (RFID) tag thereon. The dowel also includes at least one contact portion, and optionally a plurality of contact portions, positioned around a periphery of the dowel. The contact portion(s) is/are positioned on opposed sides of the first surface two edges extending along a longitudinal axis of the dowel, each defining a side of the first surface. Each of the edges is configured to contact an inner surface of the dowel sleeve to frictionally retain the dowel in the dowel sleeve. The system also includes the RFID tag.

In accordance with another broad aspect, a method of tracking a position of a piece of inventory is described herein. The method includes applying an RFID tag to a first surface of a dowel, inserting the dowel having the RFID tag thereon into a dowel sleeve of the piece of inventory, the dowel being frictionally retained in the dowel sleeve; and scanning the RFID tag with a scanner as the RFID tag is supported on the first surface of the dowel and the dowel is frictionally retained within the dowel sleeve of the piece of inventory to track the position of the piece of inventory.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
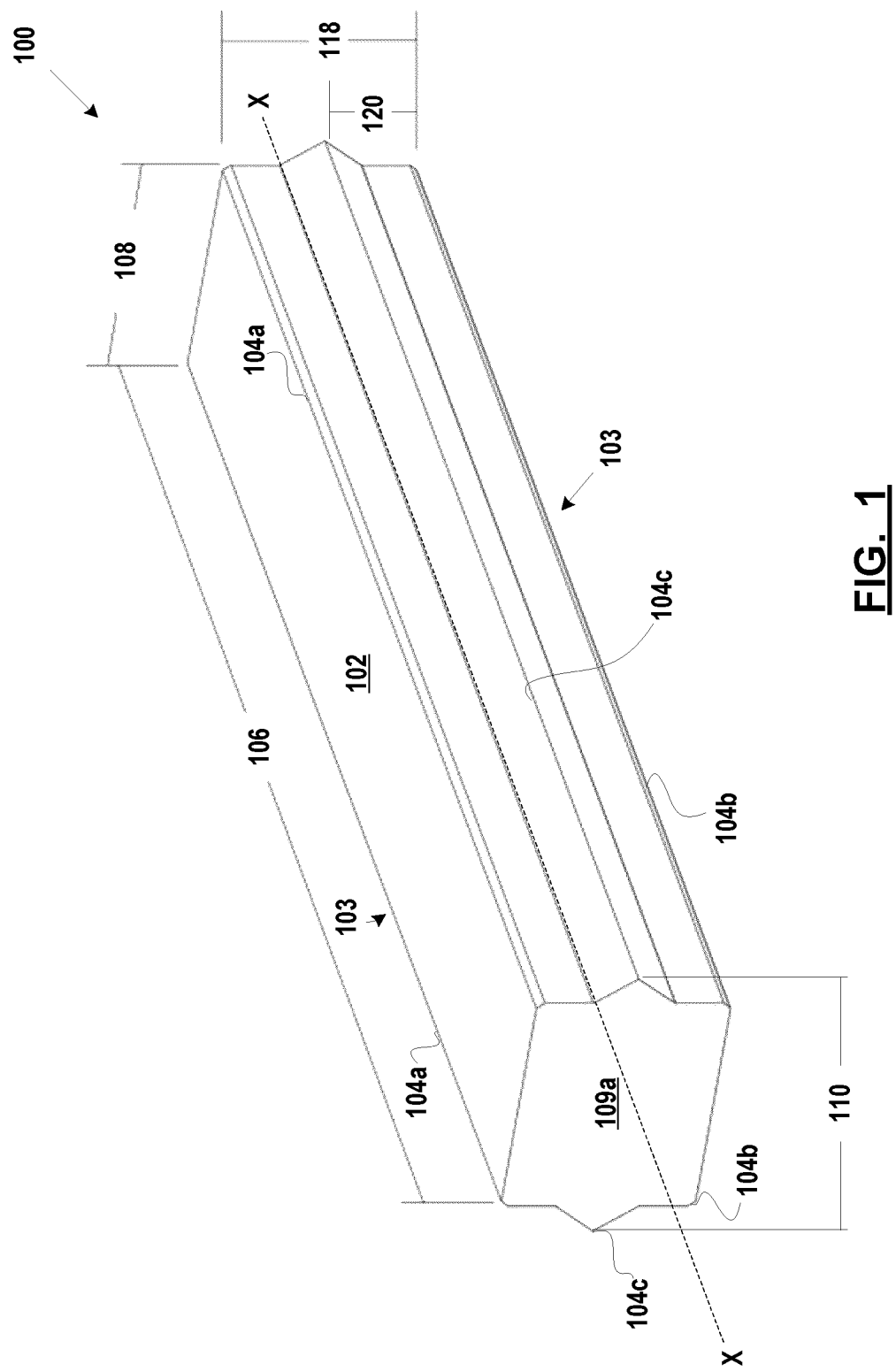
FIG. 1 is a perspective view of a dowel for inserting into a dowel sleeve of a piece of inventory for tracking a position of the piece of inventory, according to at least one embodiment described herein.

Further aspects and features of the example embodiments described herein will appear from the following description taken together with the accompanying drawings.

DETAILED DESCRIPTION

Various systems, devices and methods are described below to provide an example of at least one embodiment of the claimed subject matter. No embodiment described below limits any claimed subject matter and any claimed subject matter may cover systems, devices and methods that differ from those described below. The claimed subject matter are not limited to systems, devices and methods having all of the features of any one systems, device or method described below or to features common to multiple or all of the systems, devices and methods described below. It is possible that a system, device or method described below is not an embodiment of any claimed subject matter. Any subject matter that is disclosed in a system, device or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new systems, devices and methods for securely positioning one or more RFID tags on a piece of inventory in a position where the RFID tag is not easily damaged, accessible to an RFID scanner or reader and not prone be being detached from the piece of inventory.

Herein, dowels that are configured to frictionally engage a dowel sleeve of a piece of inventory while supporting an RFID tag on an outer surface thereof are described. The term "piece of inventory" is intended to mean one or more goods and/or materials of a list of good and/or materials that is held, for example, for sale to customers in the near future.

As will be described in more detail below, various embodiments are directed toward creating a dowel that is configured to, upon a suitable friction force between the dowel and dowel sleeve, frictionally retain the dowel in a prescribed position within the dowel sleeve.

Herein, the term "dowel" refers to a peg or a rod of wood, metal, or plastic without a distinct head, used for holding two components of a structure together, such as but not limited to two components of a cabinet or furniture.

Turning to the drawings, FIG. 1 is a perspective view of a dowel 100, according to at least one embodiment described herein.

Figure 2A:
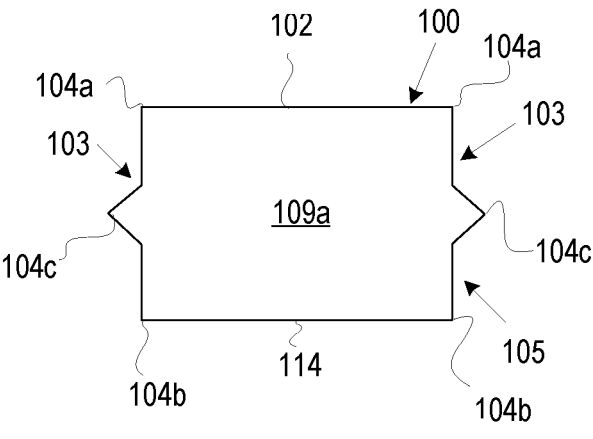
FIG. 2A is an end view of the dowel of FIG. 1.

Dowel 100 is for placement inside of a dowel sleeve of a structure or a piece of inventory. FIG. 2A shows an end view of dowel 100 of FIG. 1. Dowel 100 includes a first end 109*a* longitudinally spaced apart from second end 109*b* along longitudinal axis XX.

Dowel 100 has at least one contact portion 103 for engaging an inner surface of a dowel sleeve. Contact portion 103 engages an inner surface of a dowel sleeve to keep dowel 100 positioned within the dowel sleeve. Put another way, contact portion 103 engages an inner surface of a dowel sleeve to inhibit by friction movement of dowel 100 within the dowel sleeve, including but not limited to movement of dowel 100 out of the dowel sleeve. In the case where there is only one contact portion 103, the contact portion 103 may be a curved surface that engages with an inner surface of a dowel sleeve.

It should be understood that the number of and shape of contact portions 103 present on dowel 100 may vary provided that the dowel 100 includes a first surface 102. First surface 102 is separate, and optionally connected to, at least one contact portion 103. First surface 102 is configured to support a radio frequency identification (RFID) tag thereon. For example, first surface 102 may be a flat surface such as is shown in the figures. First surface 102 may also be a curved surface.

Figure 2B:
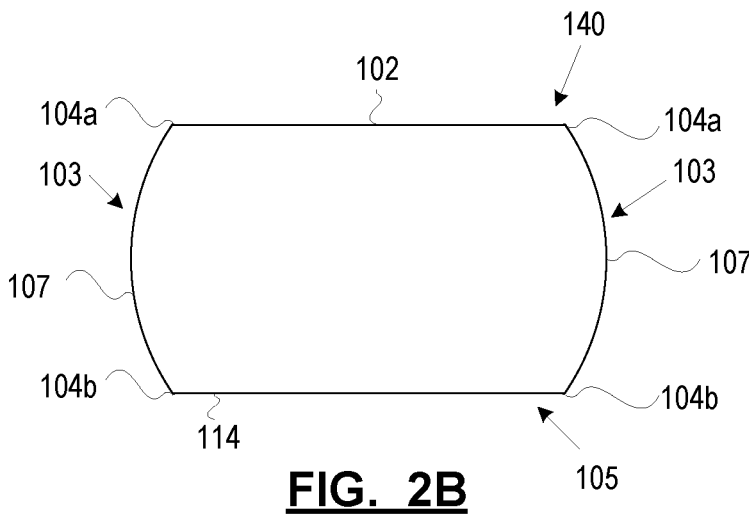
FIG. 2B is an end view of a dowel according to at least one embodiment described herein.
Figure 2C:
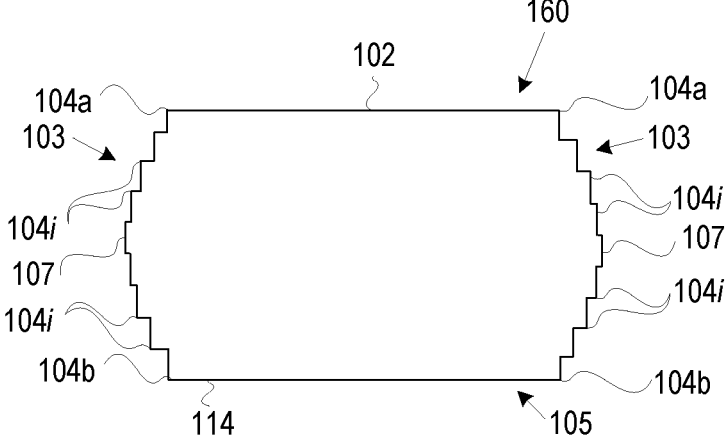
FIG. 2C is an end view of a dowel according to at least one embodiment described herein.
Figure 2D:
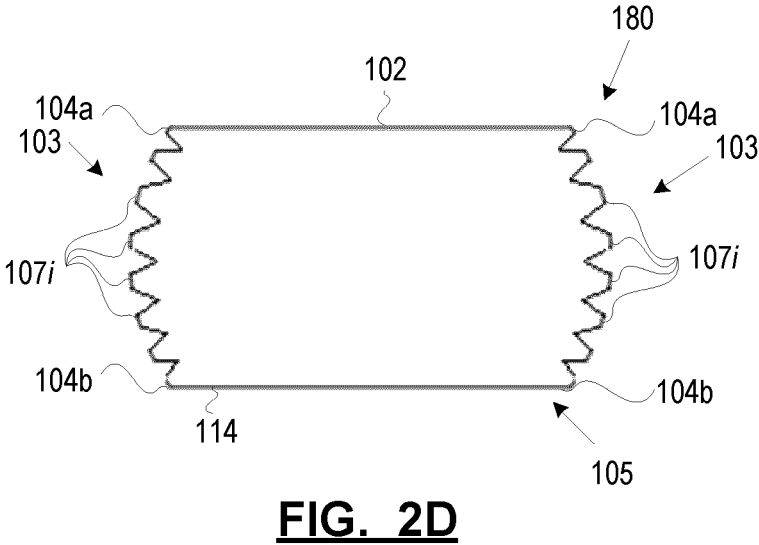
FIG. 2D is an end view of a dowel according to at least one embodiment described herein.

FIGS. 2B, 2C and 2D show end views of other examples of dowels 140, 160 and 180, respectively, where the contact portions 103 thereof have various other shapes than dowel 100. Each of these embodiments are described in greater detail below.

Figure 3:
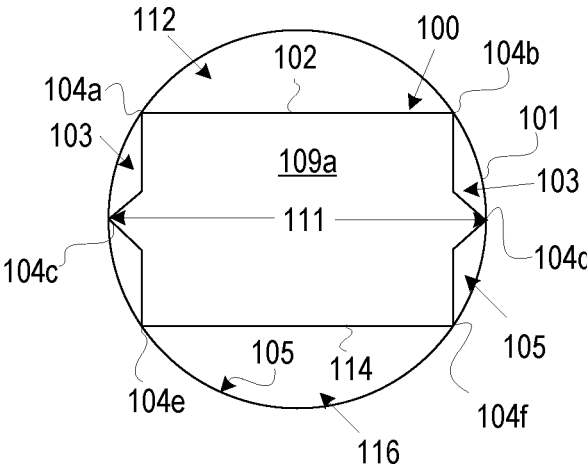
FIG. 3 is an end view of the dowel of FIG. 1 inserted into a dowel sleeve of a piece of inventory.

FIG. 3 shows an end view of a dowel 100 positioned within a dowel sleeve 101 of a piece of inventory. In FIG. 3, dowel sleeve 101 is shown as being a circular bore extending inwardly into a piece of inventory from an outer surface of the inventory, however, it should be understood that dowel sleeve 101 may be another shape, including but not limited to a square, a rectangle or an irregular shape.

Figure 4:
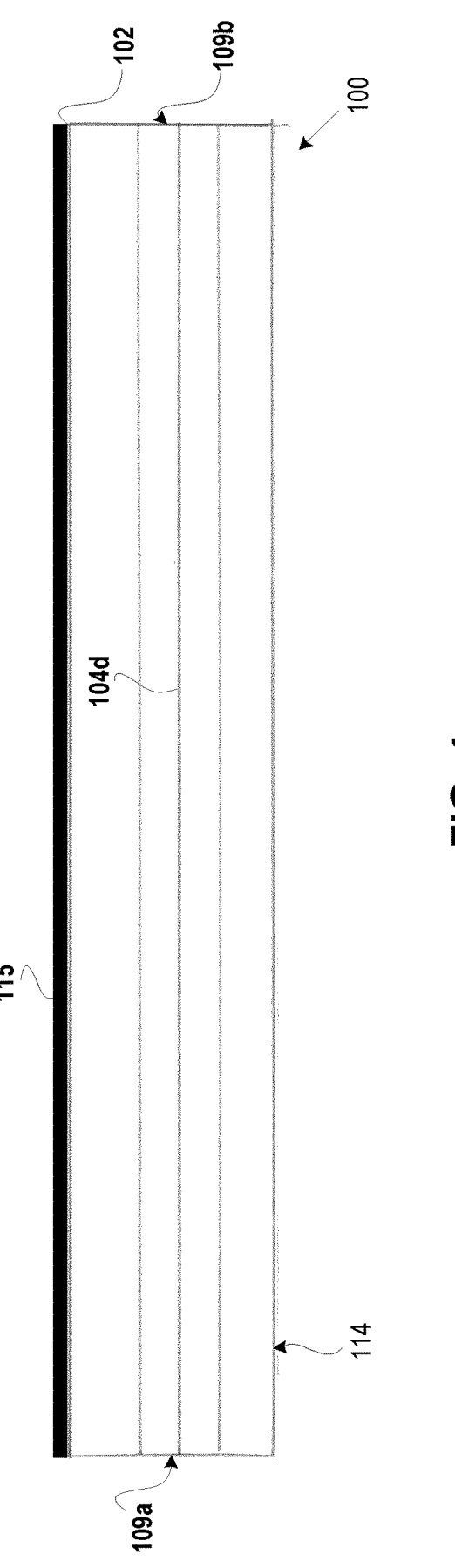
FIG. 4 is a side view of the dowel of FIG. 1 having an RFID tag positioned on a first surface thereof.

Each of the dowels described herein includes a first surface 102 configured to support a RFID tag 115 thereon. RFID tag 115 is shown in FIG. 4 being supported by dowel 100 on first surface 102.

Dowel 100 also includes two contact portions 103 of a periphery 105 of dowel 100. It should be understood that dowel 100 may include one contact portion 103 or may include more than one contact portion 103.

Periphery 105 includes first surface 102 and the at least one contact portion 103. Periphery 105 may optionally include a second surface 114 (described in greater detail below) and/or additional contact portions 103.

Each contact portion 103 is configured to extend along longitudinal axis XX to at least partially contact an inner surface 105 of dowel sleeve 101 to frictionally retain dowel 100 in dowel sleeve 101. It should be understood that herein, the term "frictionally retain" is intended to mean that dowel 100 is held within dowel sleeve 101 at a prescribed position by friction between the contact portions 103 and the inner surface of the dowel sleeve 101. Friction between contact portions 103 and inner surface 105 of dowel sleeve 101 provides for dowel 100 to inhibit movement within dowel sleeve 101.

It should be understood that it is undesirable for dowel 100 to rotate or otherwise move within dowel sleeve 101 and, therefore, move from a prescribed position within dowel sleeve 101. When dowel 100 is supporting an RFID tag 115 thereon, RFID tag 115 may be facing a selected direction when it its prescribed position in order to be accessible to an RFID scanner or reader. If dowel 100 is free to rotate within dowel sleeve 101, and dowel 100 rotates such that RFID tag 115 is no longer in the prescribed position facing the selected direction, it may become difficult for the RFID scanner or reader to access the information held on RFID tag 115. In all of the drawings shown, the selected direction is facing upwards, however, it should be understood that the selected direction may be any direction.

It should also be understood that dowel 100 is typically inserted into dowel sleeve 101 using a pneumatic dowel insertion machine, such as but not limited to a drilling and dowel insertion machine by Omal™ S.r.l. of Cantu, Italy. To be suitable for use with pneumatic dowel insertion machines, it may be desirable for dowel 100 to have a minimum amount of contact with inner surface 105 of dowel sleeve 101 required to frictionally retain dowel 100 therein, thereby minimizing a power requirement of the pneumatic dowel insertion machine to insert dowel 100 into dowel sleeve 101. Furthermore, minimizing the power requirement of the pneumatic dowel insertion machine to insert dowel 100 into dowel sleeve 101 may reduce a risk of dowel fracture during insertion.

In the embodiment of dowel shown in FIGS. 1, 2A, 3 and 4 of the drawings, dowel 100 includes two contact portions 103, each contact portion 103 having three edges 104i that extend along longitudinal axis XX and are configured to contact at least a portion of inner surface 105 of dowel sleeve 101 to frictionally retain dowel 100 within dowel sleeve 101.

In at least one embodiment, dowel 100 may include less than six edges 104i. For example, dowel 100 may five edges 104i, four edges 104i or three edges 104i.

In at least one embodiment, dowel 100 may include more than six edges 104i. For example, dowel 100 may seven edges 104i, eight edges 104i, nine edges 104i, ten edges 104i or more than ten edges 104i.

In at least one embodiment, at least one edge 104i of the plurality of edges 104 extends along an entire length 106 of dowel 100. In at least one embodiment, at least two edges 104i of the plurality of edges 104 extend along entire length 106 of dowel 100. In at least one embodiment, three or more edges 104i of the plurality of edges 104 extend along entire length 106 of dowel 100. In at least one embodiment, each of the edges 104i of the plurality of edges 104 extend along entire length 106 of dowel 100.

In the embodiment shown in the drawings, dowel 100 includes six edges, each contact portion 103 including an upper edge 104a, a lower edge 104b and a middle edge 104c. Each of the edges 104a, 104b and 104c of each of the contact portions 103 is positioned on a periphery 105 of dowel 100. Herein, the term periphery is intended to mean an external boundary of dowel 100.

Of these edges, upper edges 104a, lower edges 104b and middle edges 104c may extend along the entire length 106 of dowel 100 or may only partially extend along the entire length 106 of dowel 100. In the figures submitted herewith, upper edges 104a, lower edges 104b and middle edges 104c each extend along entire length 106 of dowel 100.

Upper edges 104a of the contact portions 103 are spaced apart from each other laterally by a distance 108. Upper edges 104a each provide outer boundaries of first surface 102, which is configured to support RFID tag 115 (see FIG. 4). First surface 102 is a continuous surface between upper edges 104a and between first end 109a and second end 109b. In at least one embodiment, first surface 102 is a planar surface. In at least one embodiment, first surface 102 may be a non-planar surface. First surface 102 is opposed to and spaced apart from (i.e., non-contacting with) a portion of inner surface 105 of dowel sleeve 101 to provide a cavity 112 defined by the inner surface 105 and first surface 102. Cavity 112 is sized to provide for RFID tag 115 to be supported by first surface 102 and be spaced apart from inner surface 105. Cavity 112 provides for, during insertion of dowel 100 into dowel sleeve 101, RFID tag 115 supported on first surface 102 to not be damaged as may occur if RFID tag 115 contacts inner surface 105 during insertion. Accordingly, first surface 102 has a width 108 that is greater than a width of RFID tag 115.

In at least one embodiment, RFID tag 115 may be supported on first surface 102 and retained on first surface 102 by an adhesive. For example, the adhesive may be applied to the first surface 102 prior to RFID tag 115 being positioned thereon, or the adhesive may be applied to RFID tag 115 and then RFID tag 115 may be applied to first surface 102.

First surface 102 is sized to support an RFID tag 115 thereon. First surface 102 is shown being positioned between the upper edges 104a, however, it should be understood that surface 102 may be oriented such that RFID tag 115 thereon faces any direction. Therefore, upper edges 104a may not be the uppermost edges of contact portions 103.

In the embodiment shown in the drawings, dowel 100 includes lower edges 104b and middle edges 104c between upper edges 104a and lower edges 104b.

Middle edges 104c are spaced apart from each other laterally by a distance 110. In at least one embodiment, distance 110 is greater than distance 108. In at least one embodiment, distance 110 is about the same as a diameter 111 of dowel sleeve 101.

Lower edges 104b are spaced apart from each other laterally by a distance 108. In at least one embodiment lower edges 104b provide outer boundaries of a second surface 114. In at least one embodiment, second surface 114 is similar in size and shape as first surface 102. In at least one embodiment, second surface 114 is a continuous surface between the lower edges 104b, and between first end 109a and second end 109b. In at least one embodiment, second surface 114 is a planar surface. Second surface 114 being a planar surface may provide for ease of application of RFID tag 115 onto first surface 102. For example, second surface 114 being a planar surface (e.g., being a planar surface that is parallel to first surface 102) may provide for dowel 100 to rest flat and stable against a support surface when RFID tag 115 is applied to first surface 102. Further, in at least one embodiment, second surface 114 may be identical in size and shape to first surface 102. Second surface 114 being identical in size and shape to first surface 102 may provide another advantage when applying RFID tag 115 onto dowel 100, as RFID tag 115 may be placed on either first surface 102 or second surface 114 in order to be used to track a position of the inventory.

Second surface 114 may be opposed to and spaced apart from a portion of inner surface 105 of dowel sleeve 101 to provide a second cavity 116 defined by the portion of inner surface 105 and second surface 114. Second cavity 116 may be sized to provide for another RFID tag 115 supported by second surface 114 to be spaced apart from inner surface 105. In this example, second cavity 116 may provide for, during insertion of dowel 100 into dowel sleeve 101, a second RFID tag 115 supported on second surface 114 to not be damaged as may occur if the second RFID tag 115 contacts inner surface 105 during insertion. Accordingly, second surface 114 may also have a width 108 that is greater than a width of the other RFID tag 115.

In at least one embodiment, upper edges 104a are spaced apart by a distance 108 that is greater than a height 118 of dowel 100.

In at least one embodiment, upper edge 104a is spaced apart vertically from lower edge 104b by height 118 of dowel 100. In at least one embodiment, middle edge 104c is spaced apart from lower edge 104b by a distance 120. In at least one embodiment, middle edge 104c is equally spaced apart from and between upper edge 104a and lower edge 104b.

In at least one embodiment, height 118 of dowel 100 is in a range of about 3 mm to about 7 mm, or of about 4 mm to about 6 mm, or is about 5 mm.

In at least one embodiment, width 110 of dowel 100 is in a range of about 4 mm to about 12 mm, or of about 6 mm to about 10 mm, or is about 8 mm.

In at least one embodiment, length 106 of dowel 100 is in a range of about 20 mm to about 60 mm, or in a range of about 30 mm to about 50 mm, or is about 40 mm, or is about 38 mm.

Contact portion(s) 103 may engage the inner surface 105 of dowel sleeve 101 in other various manners to frictionally retain the dowel therein.

For instance, in FIG. 2B, dowel 140 includes two contact portions 103, each contact portion 103 including an upper edge 104a, a lower edge 104b and a contact surface 107 therebetween. Contact surface 107 may be shaped to confirm with at least a portion of inner surface 105 to frictionally retain dowel 140 in dowel sleeve 101.

In another embodiment of dowel, as shown in FIG. 2C, dowel 160 includes two contact portions 103, each including an upper edge 104a, a lower edge 104b and a contact surface 107 therebetween. Each contact portion 103 also includes a plurality of contact edges 104i positioned between upper edge 104a and contact surface 107 and between lower edge 104a and contact surface 107. It should be understood that other shapes and numbers of contact edges 104i may be positioned between upper edge 104a and contact surface 107 and/or between lower edge 104a and contact surface 107.

In another embodiment of dowel, as shown in FIG. 2D, dowel 180 includes two contact portions 103, each including an upper edge 104a, a lower edge 104b and a plurality of contact surfaces 107i therebetween. In the embodiment shown in FIG. 2B, each of the contact surfaces 107i is shaped to conform with at least a portion of inner surface 105 of dowel sleeve 101. It should be understood that other shapes and numbers of contact surfaces 107i may be positioned between upper edge 104a and lower edge 104b.

Figure 5:
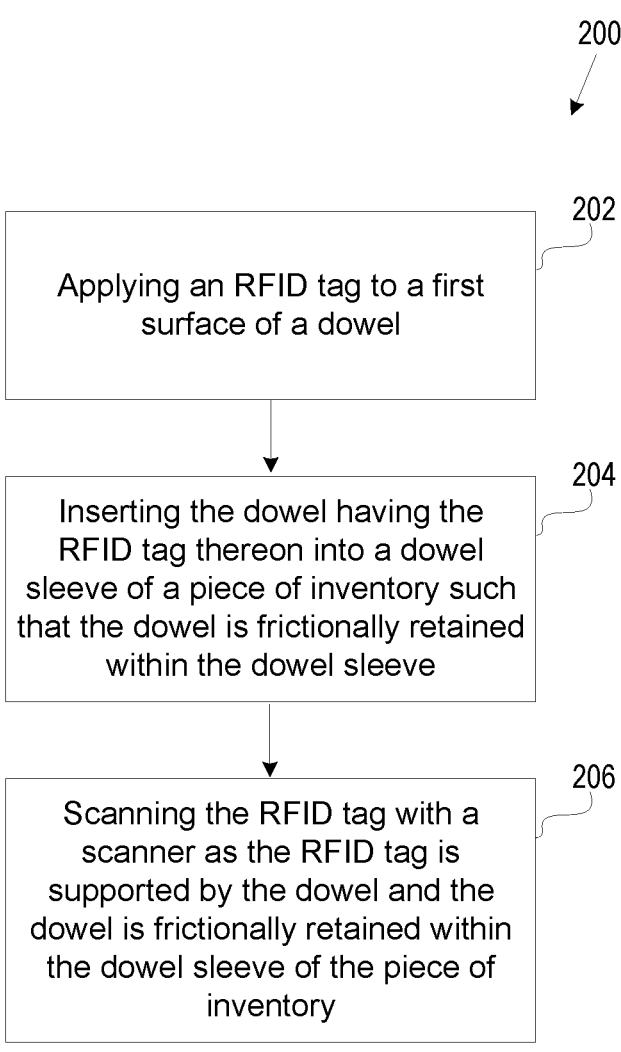
FIG. 5 is a block diagram of a method of tracking a position of a piece of inventory, according to at least one embodiment described herein.

Turning to FIG. 5, therein a method 200 of tracking a piece of inventory is shown. At a first step 202, an RFID tag 115 is applied to a first surface 102 of a dowel 100 according to at least one embodiment described herein. In at least one embodiment, the RFID tag 115 may be retained on the surface 102 of the dowel by an adhesive. As noted above, the adhesive may be first applied to either the first surface 102 of the dowel 100 or to the RFID tag 115 before applying the RFID tag 115 to the first surface 102 of the dowel 100.

At a second step 204, the dowel having the RFID tag 115 thereon is inserted into a dowel sleeve 101 of a piece of inventory. As noted above, dowel having the RFID tag 115 thereon may be inserted, for example, using a dowel insertion machine, such as but not limited to a pneumatic dowel insertion machine.

At a third step 206, after inserting the dowel sleeve 10 in to the piece of inventory, a scanner or a reader, or the like, scans the RFID tag positioned on the first surface of the dowel when the dowel is supported on the first surface of the dowel and the dowel is frictionally retained within the dowel sleeve of the piece of inventory to collect information about the piece of inventory from the RFID tag. The information may include, but not be limited to, an identifier of the piece of inventor. The scanner and/or reader may optionally attach additional information to the information about the piece of inventory from the RFID tag, such as but not limited to a position of the scanner and/or reader at the time the scanner and/or reader scanned the RFID tag 115. The scanner and/or reader may optionally attach a time to the information about the piece of inventory from the RFID tag. The scanner and/or reader may then transmit the information about the piece of inventory from the RFID tag as well as any additional information (such as but not limited to the position of the scanner and/or reader at the time of the scan and/or time of the scan) to a central server, for example, for storage. The stored information can then be used to track the position of the piece of inventory, for example over time.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A dowel for placement inside of a dowel sleeve of a piece of inventory for tracking a position of the piece of inventory, the dowel comprising:

a first outer surface spaced apart from an inner surface of the dowel sleeve when the dowel is inside the dowel sleeve, the first outer surface supporting a radio frequency identification (RFID) tag thereon; and a plurality of contact portions positioned around a periphery of the dowel, two of the contact portions being positioned on opposed sides of the first outer surface, each of the two contact portions having an edge extending along a longitudinal axis of the dowel to define a side of the first outer surface, each of the edges contacting the inner surface of the dowel sleeve to frictionally retain the dowel in the dowel sleeve.

2. The dowel of claim 1, wherein at least one edge extends along an entire length of the dowel of the dowel.

3. The dowel of claim 1, wherein each of the two edges extend along an entire length of the dowel of the dowel.

4. The dowel of claim 1, wherein each of the contact portions includes:

an upper edge extending along the longitudinal axis of the dowel, the upper edge defining the sides of the first outer surface; and a lower edge vertically spaced apart from the upper edge by a height of the dowel and extending along the longitudinal axis of the dowel, the lower edge contacting the inner surface of the dowel sleeve to frictionally retain the dowel in the dowel sleeve.

5. The dowel of claim 4, wherein the upper edges and the lower edges each extend along an entire length of the dowel.

6. The dowel of claim 4, wherein the upper edges are laterally spaced apart from each other by a distance that is less than a maximum width of the dowel sleeve.

7. The dowel of claim 6, wherein the first outer surface is a planar surface.

8. The dowel of claim 4, wherein the upper edges are laterally spaced apart from each other by a distance that provides a cavity between the inner surface of the dowel sleeve and the first outer surface of the dowel.

9. The dowel of claim 4, wherein the upper edges are laterally spaced apart from each other by a distance that is greater than a height of the dowel.

10. The dowel of claim 4, wherein each of the contact portions includes a middle edge being vertically spaced apart from and between the upper edge and the lower edge.

11. The dowel of claim 1, wherein each of the contact portions includes three edges and the dowel includes two contact portions.

12. The dowel of claim 1, wherein the dowel has a height of about 5 mm.

13. The dowel of claim 1, wherein the dowel has a width of about 8 mm.

14. The dowel of claim 1, wherein the dowel has a length of about 38 mm.

15. A dowel system for tracking a position of a piece of inventory, the dowel system comprising:

a dowel having:

a first outer surface spaced apart from an inner surface of the dowel sleeve when the dowel is inside the dowel sleeve; and a plurality of contact portions positioned around a periphery of the dowel, two of the contact portions being positioned on opposed sides of the first outer surface, each of the two contact portions having an edge extending along a longitudinal axis of the dowel to define a side of the first outer surface, each of the edges contacting the inner surface of the dowel sleeve to frictionally retain the dowel in the dowel sleeve; and a radio frequency identification (RFID) tag applied to the first outer surface of the dowel.

16. A piece of inventory comprising the dowel system according to claim 15.

17. A method of tracking a position of a piece of inventory, the method comprising:

applying an RFID tag to a first outer surface of a dowel, the first outer surface being spaced apart from an inner surface of a dowel sleeve when the dowel is inside the dowel sleeve;

inserting the dowel having the RFID tag thereon into a the dowel sleeve of the piece of inventory, the dowel being frictionally retained in the dowel sleeve; and scanning the RFID tag with a scanner as the RFID tag is supported on the first outer surface of the dowel and the dowel is frictionally retained within the dowel sleeve of the piece of inventory to track the position of the piece of inventory.

* * * * *